May 28, 1957  F. M. BAIR  2,793,879
LOAD EQUALIZING TRAILER HITCH
Filed Dec. 17, 1954
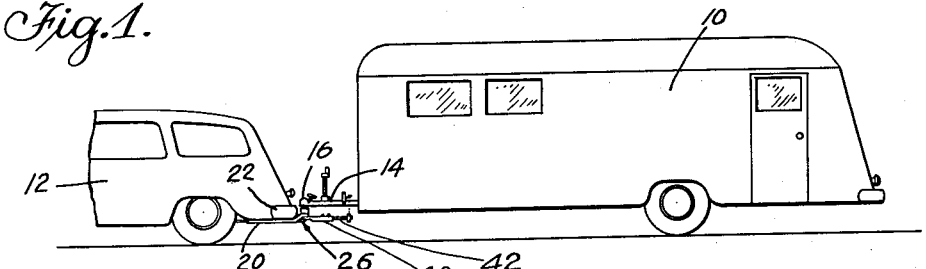
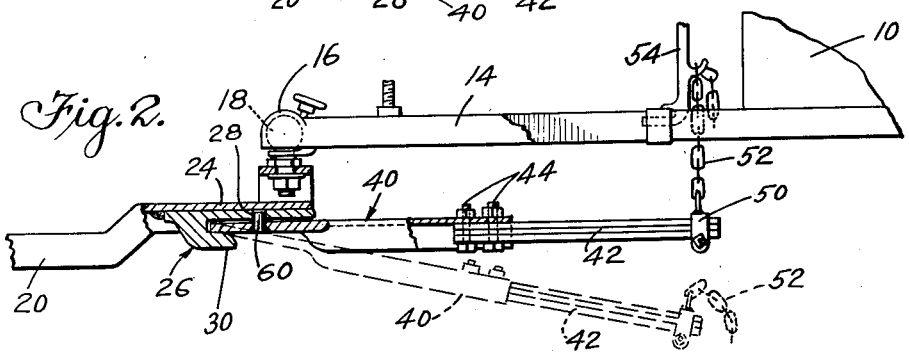
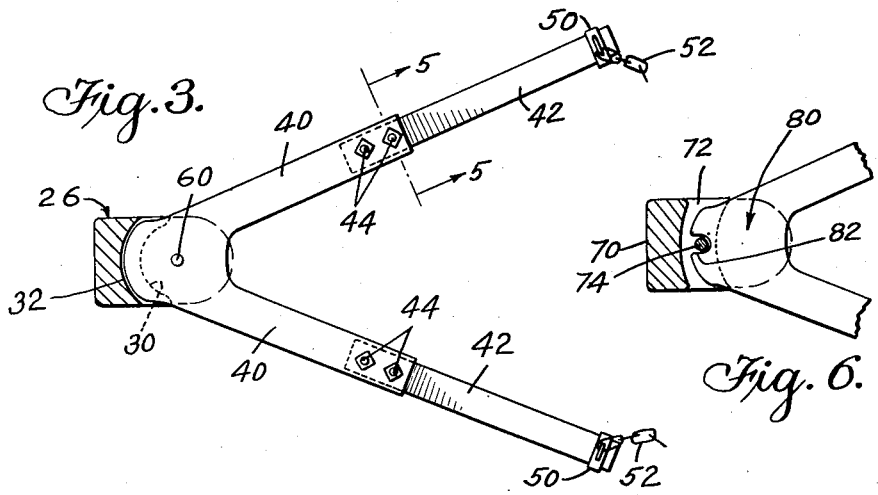
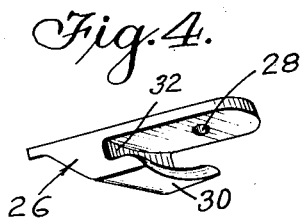
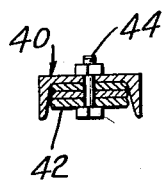
INVENTOR.
Floyd M. Bair
BY
ATTORNEY

United States Patent Office 2,793,879
Patented May 28, 1957

2,793,879
LOAD EQUALIZING TRAILER HITCH

Floyd M. Bair, North Hollywood, Calif.

Application December 17, 1954, Serial No. 475,880

1 Claim. (Cl. 280—406)

This invention relates to an improved trailer hitch and has for one of its principal objects the provision of a novel means for connecting house trailers and the like to a towing vehicle such as an automobile.

One of the important objects of the invention is the provision of an extremely simple yet highly efficient trailer hitch which can be connected into operating position in a very short space of time, and which, when so connected, will never become accidentally loose or disengaged.

Another object of the invention resides in the provision of a new and useful type of trailer hitch which is light yet sturdy and strong, and which will eliminate undesirable side sway.

Still another and further object of the invention is to provide a trailer hitch which will always maintain the towed vehicle at a desired level but which will, at the same time, afford a spring suspension which will equalize the weight of the trailer with respect to the towing vehicle, eliminating undesirable drag on the rear end of the car doing the pulling while at the same time assuring that the complete vehicular structure is positively under full control of the operator at all times.

Yet another object is to provide a trailer hitch which is, in effect, a fifth wheel for the towed vehicle, providing a simple pivoting or swivelling action, but which can be very readily disconnected when desired.

Other and further important objects of the invention will be apparent from the disclosures in the accompanying drawing and following specification.

The invention, in a preferred form, is illustrated in the drawings and hereinafter more fully described.

In the drawings:

Figure 1 is an elevational view of a trailer with towing car showing the improved hitch of this invention connecting the same.

Figure 2 is an enlarged detail view of the trailer hitch showing the method of application.

Figure 3 is a top plan view of the trailer hitch itself, one element being shown in partial section.

Figure 4 is a perspective view of the improved connecting element comprising one of the essential elements of the invention.

Figure 5 is an enlarged detail view taken on the line 5—5 of Figure 3, looking in the direction indicated by the arrows.

Figure 6 illustrates a slight modification of the invention.

As shown in the drawings:

The reference numeral 10 indicates generally a house trailer or the like which is attached to a towing vehicle or automobile 12 The trailer has a forward extension or tongue 14, which is usual equipment in devices of this type, and which terminates in a socket 16 for receiving the ball 18, which also comprises usual equipment.

A draw bar 20 is affixed to the towing car in the usual manner beneath its bumper 22 and this terminates in a plate 24 at the extremity of which is fixed the ball 18.

Welded, or otherwise suitably affixed to the underface of the plate 24, is a bifurcated element 26, shaped as best shown in Figure 4, and having an opening 28 in one portion thereof. This portion extends somewhat beyond the lower portion 30 which is slightly rounded and bevelled, as best shown in Figure 4.

The inner face of the recess between the two bifurcations is also rounded as illustrated at 32 in Figure 3, and this provides for a rolling or pivoting action of the forward end of the trailer hitch of this invention thereagainst.

The hitch itself comprises essentially a V-shaped element 40, which is preferably of cast steel or the like, and the arms of which are channelled for lightness with strength and also for the reception of the ends of a plurality of leaf springs 42 which are fastened into position by means of bolts 44.

Clips 50 fasten the ends of the leaf springs 42 together and also serve as support terminals for chains 52 which are adapted to be connected to supports or hook elements 54 mounted on the tongue or A-frame 14 of the trailer 10, and which comprise a rather usual construction in devices of this type.

A pin 60 is fitted into the V-shaped frame 40 adjacent its apex, and this is of a size to readily enter the opening 28 in the element 26.

The connection between the trailer 10 and its tow-car 12 is readily, simply and easily formed by first positioning the tongue 14 with its socket 16 over the ball 18 and making the usual connections. Then the apex of the V-portion of the hitch of this invention is inserted into the cleft between the bifurcations of the element 26 with the rear end of the hitch in lowered position, as shown in the dash lines in Figure 2. This permits of a suitable fitting of the same into desired relationship and also permits of the insertion of the pin 60 into its recess 28.

The hitch is then pulled up into the position shown in the full lines in Figure 2 and the chains 52 connected to the hook elements 54 with a suitable tension on the leaf spring elements 42. This assures of a proper co-relationship and co-operation between the associated parts, and besides affording a resilient suspension between the connected units, will eliminate sag, assure of a level pull with no corresponding and undesirable up-tilt of the towing car.

As shown in Figure 6, a draw bar 70 may be provided having an offset recessed portion 72 similar to the portion 30 of the draw bar 20, and a pin 74 is fixed in this offset extension. The forward end of the V-shaped element 80 is notched as at 82 to accommodate the pin 74, whereby a desired pivotal action results between the elements 70 and 80. Actual pulling connections can be provided as shown in Figures 2 and 3.

The weight will be equalized on all the wheels of the towing car, the draw bar pull will be properly distributed, there will be no strain on the transmission or springs of the towing car due to the soft spring action of the hitch of this invention.

Additionally, the parts are flexibly drawn into proper connected relationship with no possibility of accidental displacement and resultant damage. Furthermore, if additional strength and resiliency is desired for heavier trailers, more spring elements can be added with little or no difficulty.

I am aware that many changes may be made and numerous details of construction varied throughout a wide range without departing from the principles of this invention, and I therefore do not propose limiting the patent granted hereon otherwise than as necessitated by the prior art.

I claim as my invention:

A trailer hitch comprising a V-shaped support, means at the apex of the support for connecting the same to the draw bar of a towing car, a plurality of leaf springs fastened to the ends of the legs of the V, means for adjustably connecting the ends of the leaf springs to the trailer tongue, the means for fastening the V-frame to the tow bar including a pivot pin, a vertical axis therefor, the means for fastening the ends of the leaf springs to the trailer tongue including chains and hooks, a bifurcated element for receiving the apex of the V-shaped frame fastened to the draw bar of the towing car, and a recess in one portion of the bifurcated element for receiving the pivot pin at the apex of the V-frame, the second portion of the bifurcation providing a support for the forward end of the V-frame, the forward end of the V-frame being arcuate to correspond with an arcuate recess in the cleft of the bifurcated element, and wherein said arcuate portions are about a joint corresponding with the attaching pin.

References Cited in the file of this patent

UNITED STATES PATENTS

| 2,453,941 | Smit | Nov. 16, 1948 |
| 2,597,657 | Mathisen | May 20, 1952 |
| 2,643,891 | Mosley | June 30, 1953 |
| 2,715,034 | Cornwall | Aug. 9, 1955 |

FOREIGN PATENTS

| 721,901 | France | Dec. 23, 1931 |